United States Patent Office 3,391,096
Patented July 2, 1968

3,391,096
PROCESS FOR PRODUCTION OF NON-FLAMMABLE CELLULOSE GRAFT COPOLYMER
Zakhar Alexandrovich Rogovin, Margarita Alexandrovna Tuganova, Jury Gavrilovich Krjazhev, and Tamara Jakovlevna Zharova, Moscow, U.S.S.R., assignors to Moscowsky Tekstiljny Institute, Moscow, U.S.S.R.
No Drawing. Filed May 5, 1964, Ser. No. 365,143
5 Claims. (Cl. 260—17.4)

ABSTRACT OF THE DISCLOSURE

A process for producing non-flammable cellulose materials by treating a graft copolymer of cellulose and poly-(2-methyl-5-vinyl pyridine) with dilute phosphoric acid at 20°–60° C.

This invention relates to a process for the production of non-flammable cellulose materials.

Heretofore, several processes were known for fire-proofing cellulose materials by treatment of various cellulose based fabrics with such agents as methylol phosphonium chloride. According to this process the cellulose material is required to be heated to 140–150° C. Another disadvantage is that process stems from the fact that the process should be carried out in a strongly acidic medium which involves the use of special equipment.

Another prior art process consisting in the treatment of cellulose materials with an emulsion containing antimony trioxide and titanium salts also has a number of disadvantages, i.e. an appreciable increase in the weight of treated fabrics, the use of organic solvents, and low fastness of the treated fabrics to washing with alkaline soaps.

The object of this invention is to develop a simple industrial process for the production of non-flammable cellulose based fabrics in an aqueous medium at moderate temperatures.

Another object of this invention is to render cellulose materials non-flammable with the aid of readily available starting chemicals.

In accordance with these and other objects, the invention consists in a new process for the production of non-flammable cellulose materials which is described hereinafter and defined in the appended claims. It should also be understood that although a specific embodiment of the invention is hereinafter given, various changes and modifications can readily occur to those skilled in the art without departing from the spirit of the invention and the scope thereof.

Other objects and advantages of the invention will become clear from the detailed description which follows:

The proposed process for the production of non-flammable cellulose materials comprises synthesizing a graft copolymer of cellulose with poly-(2-methyl-5-vinyl pyridine) and subsequently treating the copolymer obtained with dilute phosphoric acid. The cellulose to be used in the process may be fabric, yarn, paper, films, etc. This procedure yields a phosphate of the copolymer of cellulose and poly-(2-methyl-5-vinyl pyridine) which is not hydrolyzed, even after prolonged treatment with distilled water.

The graft copolymer of cellulose and poly-(2-methyl-5-vinyl pyridine) may be obtained by any of the known techniques wherein macro-radicals which are able to initiate polymerization of methyl vinyl pyridine, e.g. by ozonization, irradiation, chain transfer, etc. are incorporated into cellulose molecules. The most suitable process, by which macroradicals are formed in cellulose, is the introduction of aromatic amino groups, their subsequent diazotization, and decomposition of the diazonium salts obtained in the presence of divalent iron salts with the formation of free radicals which cause polymerization of methyl vinyl pyridine.

Example

Cotton fabric weighing 100 g. was soaked in a 13% solution of sulfuric ether of 4,β-hydroxyethylsulphonyl-2-aminoanisole, processed in a padding machine and steamed at a pressure of 1 kg./sq. cm. for 15 minutes. After washing and drying, the fabric contained 0.2–4% nitrogen. A test sample of 50 g. was treated with a solution containing 1% $NaNO_2$ and 1% HCl at 0° C. for ten minutes to diazotize the amino group.

Bath modulus, 30. Then the sample was washed in ice-cold water and immersed in a mixture containing 500 g. of methyl vinyl pyridine, 500 g. of acetic acid, 2 g. of $FeSO_4 \cdot 7H_2O$ and 1 liter of water.

The fabric was kept in the solution for 24 hours at 20° C., then washed in 5% acetic acid and dried at a temperature of 60° C. The graft copolymer obtained was treated with 0.5% phosphoric acid solution at a temperature of 20° C. for 20 minutes, washed in distilled water and dried.

The dried sample contained 3.25% phosphorus and displayed maximum resistance to fire.

Although a specific embodiment of the invention has been disclosed in this description, it should be understood that various changes and modifications may readily occur to those skilled in the art without departing from the spirit of the invention and the scope thereof. These changes and modifications will be considered to fall within the scope of the invention and the appended claims.

We claim:
1. A process for rendering cellulosic materials non-flammable, said process comprising modifying a cellulosic material by introducing an aromatic amino group thereinto, diazotizing the aromatic amino group in the thusly modified cellulosic material, co-polymerizing the diazotized, modified cellulosic material with methyl vinyl pyridine in the presence of a divalent iron salt to form a graft co-polymer and treating the thusly obtained graft co-polymer with a dilute solution of phosphoric acid.
2. A process as claimed in claim 1 wherein the divalent iron salt is $FeSO_4 \cdot 7H_2O$.
3. A process as claimed in claim 1 wherein the dilute solution of phosphoric acid is of a concentration of 0.5–1%.
4. A process as claimed in claim 1 wherein treating of the graft co-polymer is effected at a temperature of 20°–60° C.
5. A process as claimed in claim 1 wherein the cellulosic material to be modified is fabric, yarn, paper or film.

References Cited

UNITED STATES PATENTS

| | | | |
|---|---|---|---|
| 2,765,229 | 10/1956 | McLaughlin | 260—17.4 |
| 3,125,406 | 3/1964 | Herman | 260—17.4 |
| 2,632,742 | 3/1953 | Eikert. | |
| 2,912,394 | 10/1959 | Stilbert et al. | |

WILLIAM H. SHORT, *Primary Examiner.*

J. NORRIS, *Assistant Examiner.*